(12) United States Patent
Tsugimura

(10) Patent No.: US 8,643,880 B2
(45) Date of Patent: Feb. 4, 2014

(54) CONTROL APPARATUS AND CONTROL PROGRAM CONTROLLING PRINTING PLURALITY OF IMAGE FILES

(75) Inventor: Koichi Tsugimura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 621 days.

(21) Appl. No.: 12/979,489

(22) Filed: Dec. 28, 2010

(65) Prior Publication Data

US 2011/0157646 A1    Jun. 30, 2011

(30) Foreign Application Priority Data

Dec. 28, 2009   (JP) ................................ 2009-298212

(51) Int. Cl.
*G06F 3/12*     (2006.01)

(52) U.S. Cl.
USPC .......................... 358/1.15; 358/1.18; 715/274

(58) Field of Classification Search
None
See application file for complete search history.

(56) References Cited

U.S. PATENT DOCUMENTS

| | | | |
|---|---|---|---|
| 8,054,494 B2 * | 11/2011 | Takahashi et al. ............ | 358/1.15 |
| 8,351,072 B2 * | 1/2013 | Mitani ............................ | 358/1.6 |
| 2001/0019416 A1 * | 9/2001 | Monty et al. .................... | 358/1.9 |
| 2001/0040685 A1 * | 11/2001 | Winter et al. ................... | 358/1.6 |
| 2002/0033965 A1 * | 3/2002 | Winter et al. ................. | 358/1.15 |
| 2002/0051201 A1 * | 5/2002 | Winter et al. ................. | 358/1.16 |
| 2002/0057452 A1 * | 5/2002 | Yoshino ........................ | 358/1.15 |
| 2003/0070146 A1 * | 4/2003 | Sato et al. ...................... | 715/525 |
| 2004/0190057 A1 * | 9/2004 | Takahashi et al. ............ | 358/1.15 |
| 2007/0236709 A1 * | 10/2007 | Mitani ............................ | 358/1.6 |
| 2008/0080001 A1 | 4/2008 | Yamada | |
| 2008/0259395 A1 * | 10/2008 | Mori ............................. | 358/1.15 |
| 2009/0244620 A1 * | 10/2009 | Takahashi et al. ............ | 358/1.15 |

FOREIGN PATENT DOCUMENTS

| | | |
|---|---|---|
| JP | H06-162084 | 6/1994 |
| JP | A-2006-155281 | 6/2006 |
| JP | 2006-247946 | 9/2006 |
| JP | A-2007-11979 | 1/2007 |
| JP | A-2007-129442 | 5/2007 |

(Continued)

OTHER PUBLICATIONS

Notification of Reason for Refusal dated Aug. 30, 2011 received from the Japanese Patent Office from related Japanese Application No. 2009-298212, together with an English-language translation.

*Primary Examiner* — Twyler Haskins
*Assistant Examiner* — Nicholas Pachol
(74) *Attorney, Agent, or Firm* — Scully, Scott, Murphy & Presser, PC

(57) ABSTRACT

A printing control apparatus including: a file obtaining section that obtains a specified file including one or more sub-files of a first type and a sub-file of a second type; and a print control section that controls a print section, wherein when a first sub-file of the first type includes M (M being equal to or greater than 1) sets of selected image data and a second sub-file of the first type includes N (N being equal to or greater than 1) sets of selected image data, the print control section controls the print section to obtain a first printing result in which M images based on the M sets of selected image data are printed on a first print medium, and N images based on the N sets of selected image data are printed on a second print medium, which is different from the first print medium.

8 Claims, 10 Drawing Sheets

(56) References Cited

FOREIGN PATENT DOCUMENTS

| | | |
|---|---|---|
| JP | 2007-295488 | 11/2007 |
| JP | A-2008-87177 | 4/2008 |
| JP | A-2008-269318 | 11/2008 |
| JP | A-2009-246894 | 10/2009 |

\* cited by examiner

US 8,643,880 B2

CONTROL APPARATUS AND CONTROL PROGRAM CONTROLLING PRINTING PLURALITY OF IMAGE FILES

CROSS REFERENCE TO RELATED APPLICATIONS

The present application claims priority from Japanese Patent Application No. 2009-298212 filed on Dec. 28, 2009, the disclosure of which is incorporated herein by reference in its entirety.

TECHNICAL FIELD

Aspects of the present invention relate to a control apparatus for printing.

BACKGROUND

There has been proposed a related-art printer apparatus for printing images based on a plurality of image files. The related-art printer apparatus produces an order sheet including a plurality of thumbnails corresponding to the plurality of image files. The related-art printer apparatus prints the image based on the image file that corresponds to the thumbnail selected by a user in the order sheet.

SUMMARY

In the related-art printer apparatus, the respective image files include one image data. However, the data structure of an image file is becoming complicated. The related-art printer apparatus is not considered to be capable of executing printing of an image file having a complicated data structure. A control apparatus for printing according to an exemplary embodiment of the present invention is configured to execute an appropriate printing in correspondence with the complicated data structure of an image file.

According to an illustrative embodiment of the present invention, there is provided a printing control apparatus comprising a file obtaining section that obtains a specified file, which includes one or more sub-files of a first type and a sub-file of a second type; and a print control section that controls a print section to execute printing according to the specified file, wherein the one or more sub-files of the first type includes one or more sets of image data, wherein the sub-file of the second type includes sets of image information that corresponds to the sets of image data included in the one or more sub-files of the first type, wherein the corresponding sets of image information include image selection information that indicates whether each set of image data corresponding to the image information is selected, wherein the print control section controls the print section to print an image based on the selected image data corresponding to the image selection information, and wherein during a specified mode, when a first sub-file of the first type includes M (M being an integer equal to or greater than 1) sets of selected image data and a second sub-file of the first type includes N (N being an integer equal to or greater than 1) sets of selected image data, the print control section controls the print section to obtain a first printing result in which M images based on the M sets of selected image data are printed on a first print medium, and N images based on the N sets of selected image data are printed on a second print medium, which is different from the first print medium.

A control method and a computer program for realizing the control apparatus are also newly provided.

Figure 1:
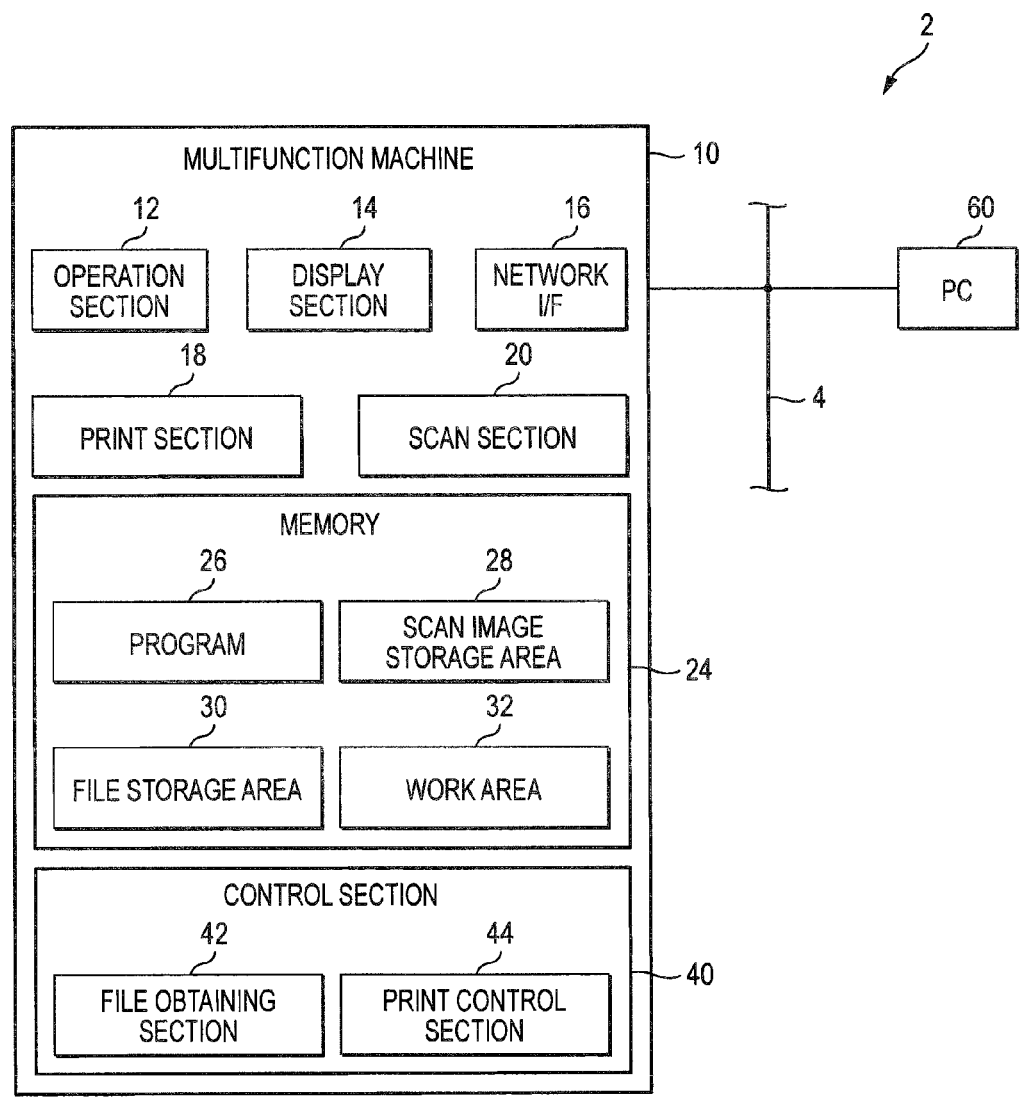
FIG. 1 shows an example of configuration of a function operating system.

DETAILED DESCRIPTION OF EXEMPLARY EMBODIMENTS (Configuration of System)
Hereinafter, an exemplary embodiment in which a control apparatus of an exemplary embodiment of the present invention is implemented will be described with reference to the drawings. FIG. 1 schematically shows a function operating system 2 of the present embodiment. The function operating system 2 includes a LAN 4, a multifunction machine 10, and a PC 60. The multifunction machine 10 and the PC 60 are connected to the LAN 4, and communicate with each other via the LAN 4.

(Configuration of Multifunction Machine 10)
The configuration of the multifunction machine 10 will now be described. The multifunction machine 10 has a multifunction including a copying function, a printing function, a scanning function, etc. The multifunction machine 10 includes an operation section 12, a display section 14, a network interface 16, a print section 18, a scan section 20, a memory 24, and a control section 40. The operation section 12 includes a plurality of keys. A user can input various instructions to the multifunction machine 10 by manipulating the operation section 12. The display section 14 is configured to display various kinds of information. The network interface 16 is connected to the LAN 4. The print section 18 includes a printing mechanism such as an inkjet-print type, laser-print type, etc., and executes printing based on instructions from the control section 40. The scan section 20 includes a scanning mechanism such as CIS, CCD, etc., and performs scanning of an object based on the instructions from the control section 40, thereby producing image data. The image data is hereinafter referred to as a "scan image".

The memory 24 stores a program 26. The control section 40 is configured to perform a process according to the program 26 stored in the memory 24. The processing of the control section 40 under the program 26 makes it possible to activate functions of the file obtaining section 42 and the print control section 44. The memory 24 includes a scan image storage area 28, a file storage area 30, and a work area 32. The scan image storage area 28 stores scan image data produced by the scan section 20. The file storage area 30 stores files (see FIGS. 2 to 5) which are produced according to the file producing process (see FIG. 6) performed by the control section 40. The work area 32 temporarily stores data which is produced when the process is performed by the control section 40.

(Configuration of File 100)

The configuration of a flip stored in the file storage area 30 will now be described with reference to FIGS. 2 to 5. The file 100 includes an index sheet 102 (see FIG. 2) which indicates an index, three image sheets 200, 220, and 240 (see FIGS. 3 to 5) which indicates a plurality of images allocated to the respective sheets, etc. The file 100 includes image data (i.e. scan image data to be described later), which is indicative of the plurality of images (11 images in the present embodiment) configured to be displayed on the three image sheets 200, 220, and 240. The respective sheets such as the index sheet 102 are changed and displayed by manipulation of tabs 104 to 110. In the present embodiment, the tab 104 indicating an "index" corresponds to the index sheet 102. Tabs 106, 108, and 110 indicating "sheets 1, 2, and 3" correspond to first, second, and third image sheets. A file of "Excel (registered trademark)" produced by Microsoft is an example of a file 100.

Figure 3:
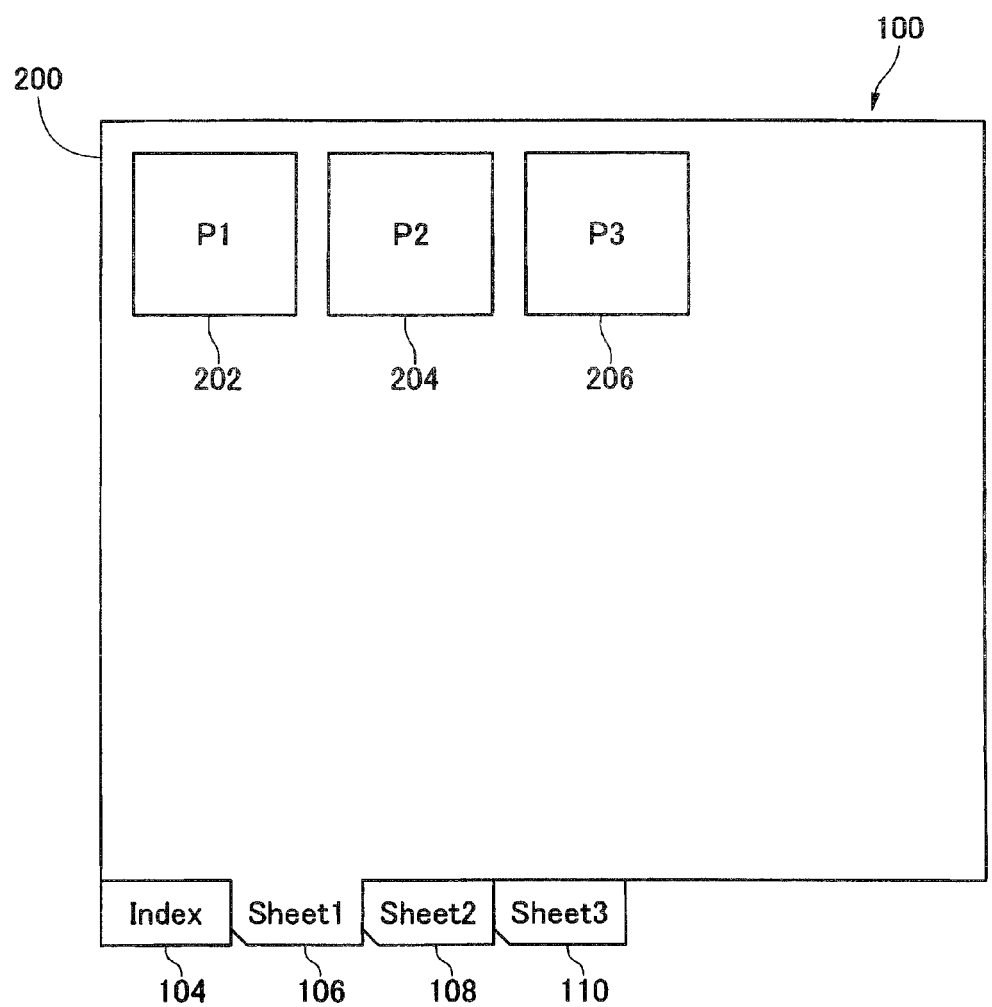
FIG. 3 shows an example of a first image sheet.
Figure 4:
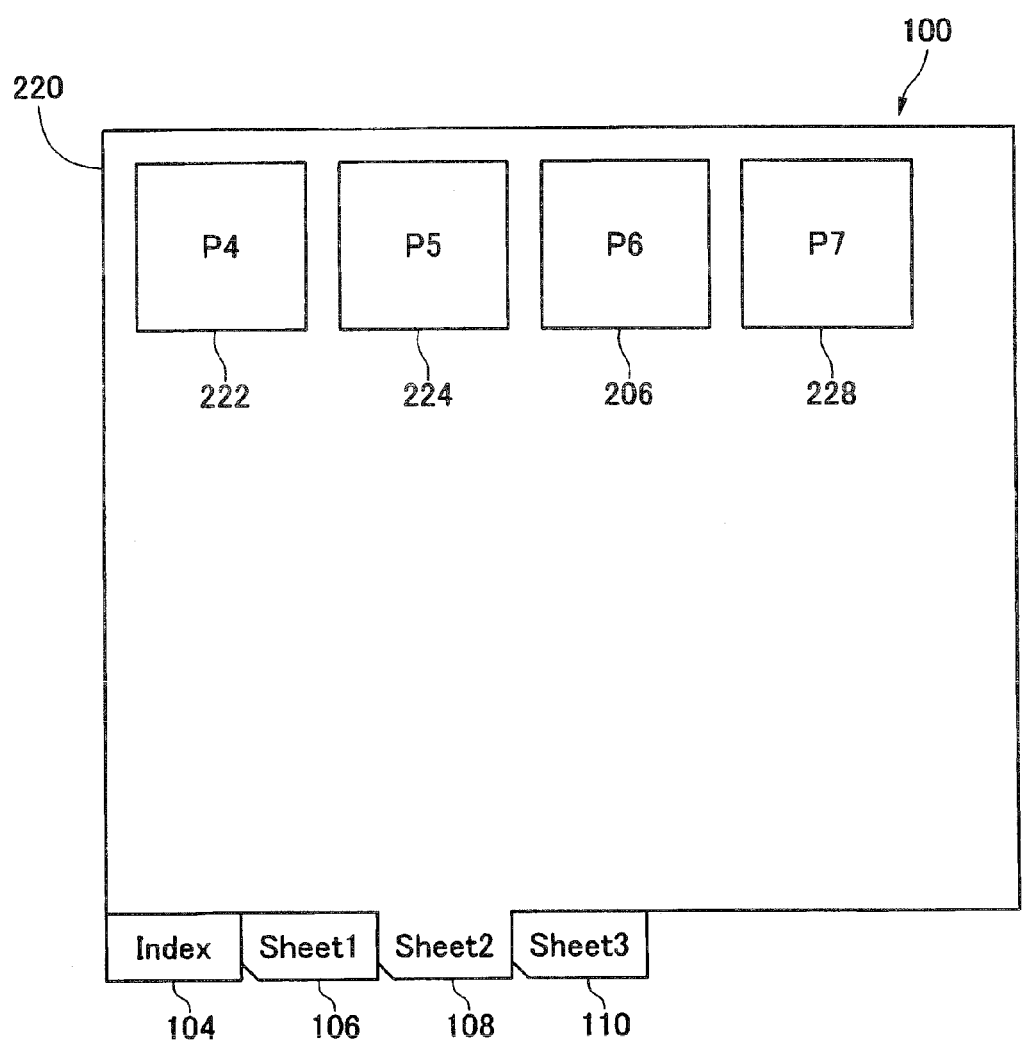
FIG. 4 shows an example of a second image sheet.
Figure 5:
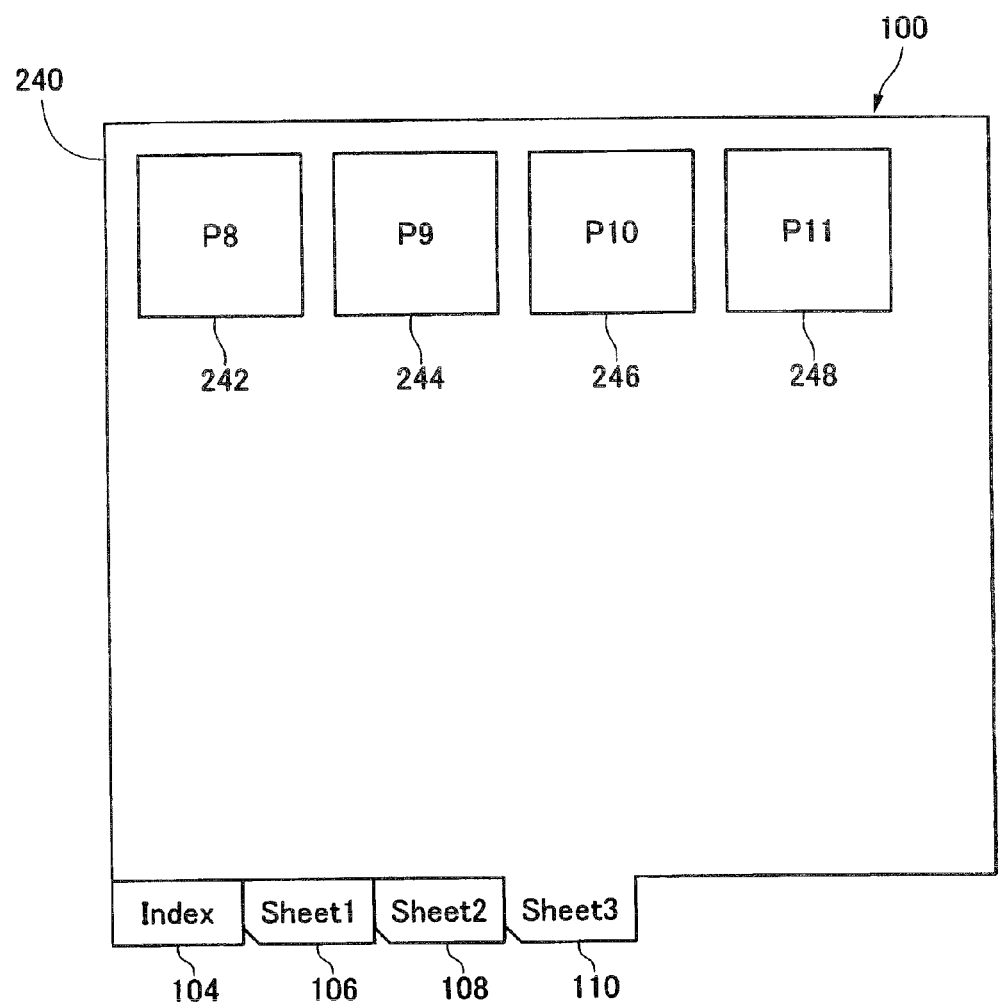
FIG. 5 shows an example of a third image sheet.

The first image sheet 200 will be described with reference to FIG. 3. The first image sheet 200 includes a plurality of sets of attribute information (three sets of attribute information in this embodiment) for displaying a plurality of images (three images in this embodiment: 202, 204, and 206). The respective sets of attribute information includes identification information of image data indicative of the image that corresponds to the related attribute information, a display size of the image, and a display location of the image provided in the first image sheet 200. When a user manipulates the tab 106 corresponding to the first image sheet 200, the three images 202, 204, and 206 are displayed according to the three sets of attribute information. That is, a device (e.g. the PC 60) for displaying the file 100 displays the image based on the image data that is indicated by the identification information of the image data included in the attribute information, with a display size and a location which are included in the attribute information. As described above, the three sets of attribute information included in the first image sheet 200 respectively include information (identification information, a display size, and a display location of image data) for displaying images based on the image data. This means that the first image sheet 200 includes three sets of image data. The second and third image sheets 220 and 240, which are shown in FIGS. 4 and 5, also have the same configuration as the first image sheet 200 of FIG. 3. The second image sheet 220 includes a plurality of sets of attribute information (i.e. a plurality of sets of image data) for displaying a plurality of images (four images in the present embodiment: 222 to 228). Further, the third image sheet 240 includes a plurality of sets of attribute information (i.e. a plurality of sets of image data) for displaying a plurality of images (four images in the present embodiment: 242 to 248).

The index sheet 102 will be described with reference to FIG. 2. The index sheet 102 includes a print layout selection field 120, an image sheet selection field 130, and a plurality of thumbnails 140 to 166. The print layout selection field 120 includes three check boxes 122 to 126. The three check boxes 122 to 126 correspond to different print layouts. Specifically, the check boxes 122, 124, and 126 correspond to the print layout for a "single page", a "sheet unit per page", and an "image per page", respectively. A user can check one of the check boxes in the print layout selection field 120. Accordingly, a print process that corresponds to the print layout that is selected by the user is performed.

The image sheet selection field 130 includes three check boxes 132 to 136. The three check boxes 132 to 136 correspond to different image sheets 200 to 240. Specifically, the check boxes 132, 134, and 136 correspond to the first, second, and third image sheets 200, 220, and 240, respectively. A user can check which of the check boxes in the image sheet selection field 130 that he/she wants. Checking a certain image sheet means that all image data included in the checked image sheet is selected as an object to be printed.

The respective thumbnails 140 to 144, 150 to 156, and 160 to 166 are reduced-size images of the images 202 to 206, 222 to 228, and 242 to 248. For example, the thumbnail 140 shown in FIG. 2 is an image indicative of "P1". As shown in FIG. 3, the image 202 is also the image indicative of "P1". Thus, it can be understood that the thumbnail 140 is a smaller-sized version image of the image 202. The index sheet 102 includes a plurality of sets of display information (eleven sets of information in the present embodiment) for displaying the plurality of thumbnails (eleven thumbnails in the present embodiment: 140 to 144, 150 to 156, and 160 to 166). The respective display information includes identification information of image data indicative of a thumbnail that corresponds to the display information, a display size of the thumbnail, and a display location of the thumbnail in the index sheet 102. When a user manipulates the tab 104 corresponding to the index sheet 102, the eleven thumbnails 140 to 144, 150 to 156, and 160 to 166 are displayed according to the eleven sets of display information. That is, a device (e.g. the PC 60) for displaying the file 100 displays the image based on the image data that is indicated by the identification information of the image data included in the display information, with a display size and a location which are included in the display information. As described above, the eleven sets of display information included in the index sheet 102 respectively includes information (identification information, a display size, and a display location of image data) for displaying the thumbnail 140 etc. This means that the index sheet 102 includes reduced-size sets of image data (i.e. 11 thumbnails 140 etc.) of the eleven sets of image data.

Further, the display sizes of the thumbnails 140 etc., which are included in the respective sets of display information, are smaller than those included in the respective sets of attribute information in the respective image sheets 200 etc. Furthermore, the display locations of the respective thumbnails 140 etc., which are included in the respective display information are configured such that 11 thumbnails 140 etc. are separately displayed in the index sheet 102 based on the image sheets (200, etc.) in which the corresponding images are displayed. Specifically, the display locations of the respective thumbnails 140, etc., which are included in the respective sets of display information are the information for separately displaying the 11 thumbnails 140, etc., on different line for each image sheet (200 etc.). That is, as shown in FIG. 2, the thumbnails 140 to 144 that correspond to the images 202 to 206 displayed on the first image sheet 200 are arranged as a group in the first line on the index sheet 102. Further, at the same level of the group of the thumbnails 140 to 144 in the first line, the check box 132 of the image sheet selection field 130 is located. That is, the group of the thumbnails 140 to 144 and the check box 132 are arranged correspondingly to each other. Similarly, the thumbnails 150 to 156 that correspond to the images 222 to 228 displayed on the second image sheet 220 are arranged as a group in the second line on the index sheet 102. The thumbnails 160 to 166 that correspond to the image data 242 to 248 displayed on the third image sheet 240 are arranged as a group in the third line on the index sheet 102. The check box 134 is arranged correspondingly to the group of the thumbnails 150 to 156 in the second line, and the check box 136 is arranged correspondingly to the group of thumbnails 160 to 166 in the third line.

The check boxes 140a to 166a and the thumbnail identification information 140b to 166b are arranged correspondingly to the respective thumbnails 140 etc. A user can mark the check boxes that correspond to the thumbnails (i.e. image data). An marked state of the check box corresponding to the thumbnail means that the image data corresponding to the related thumbnail is selected as an object to be printed. Conversely, an unmarked state of the thumbnail means that the image data corresponding to the related thumbnail is not selected as an object to be printed. Further, as described above, in a case where the check box 132 etc. of the image sheet selection field 130 becomes marked, all of image data included in the image sheet 200 etc. that correspond to the marked check box 132 etc. are selected as an object to be printed, irrespective of whether other check box 140a etc. is marked or not. The thumbnail identification information 140b etc. corresponding to the thumbnail is the information with which a user identifies the related thumbnail. As the thumbnail identification information, arbitrary string text is used, which includes for example identification information of the image data corresponding to the related thumbnail, date, serial number, combination thereof, etc.

(File Creating Process)

Figure 6:
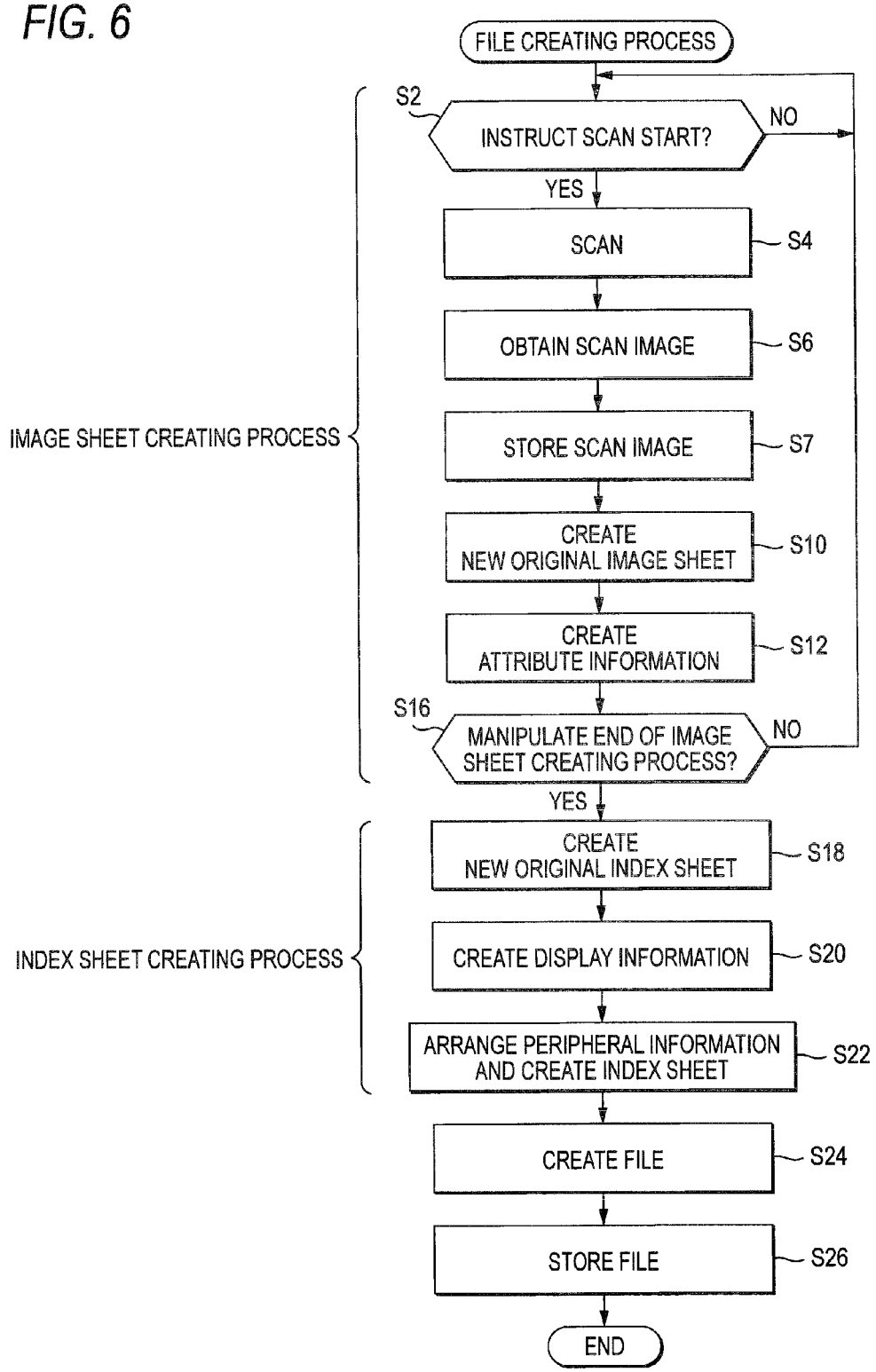
FIG. 6 shows a flow chart of a file creation process.

A file creating process performed by the control section 40 of the multifunction machine 10 will be described. FIG. 6 shows a flow chart of the file creating process performed by the control section 40. By manipulating the operation section 12 of the multifunction machine 10, a user can input certain instructions for starting the file creating process to the multifunction machine 10. When the particular instructions are input, the control section 40 first performs an image sheet creating process of S2 to S16. In the image sheet creating process, the control section 40 first monitors whether scan starting instructions are input by a user (S2). The user can input the scan starting instructions to the multifunction machine 10 by manipulating the operation section 12 when, for example n (an integer of 1 or more) scan objects (e.g. n papers) are set in an automatic document feeder (not shown). In this case, the control section 40 determines YES in S2 and proceeds to S4.

In S4, the control section 40 controls the scan section 20 to scan the n scan objects in sequence. As a scanning result of the scan section 20, the control section 40 obtains n (an integer of 1 or more) scan image data (S6). Subsequently, the control section 40 stores the respective n scan image data, which are obtained in S6, in the scan image storage area 28, while adding the identification information which is set in a certain manner to the scan image data (S8). Subsequently, the control section 40 creates a new original image sheet that is a base of the image sheet (e.g. 200) (S10). The new original image sheet that is created in S10 does not yet include the attribute information for displaying an image (e.g. 202).

Subsequently, the control section 40 creates n attribute information for displaying n images (e.g. 202) on the image sheet (e.g. 200) (S12). Specifically, the control section 40 creates the attribute information for each scan image data obtained in S6 by determining the identification information of the related scan image data, the display size of the image (e.g. 202) displayed by the related scan image data, and the display location of the related image, according to a predetermined command. The control section 40 adds the n attribute information to the new original image sheet created in S10, thereby creating a single image sheet (e.g. 200). Hereinafter, the process of creating the file 100 including the index sheet 102 of FIG. 2 and the image sheets 200 to 240 of FIGS. 3 to 5 will be described as an example of the respective processes. In the example, the control section 40 first obtains three scan image data in S6, creates three attribute information for displaying three images 202 to 206 in S12, and adds the three attribute information to the new original image sheet that is created in S10, thereby creating the first image sheet 200. Consequently, the first image sheet 200 including the three attribute information for displaying the three images 202 to 206 (i.e. the first image sheet including the three scan image data) is created.

Subsequently, the control section 40 determines whether or not the manipulation to terminate the image sheet creating process has been carried out by a user (S16). The user can perform the process by manipulating the operation section 12 of the multifunction machine 10. In this case, the control section 40 determines YES in S16. Here, the image sheet creating process of S2 to S16 is terminated, and then the process proceeds to an index sheet creating process of S18 to S22. Meanwhile, if NO is determined in S16, the control section 40 returns to S2 and monitors for the input of new scan start instructions. The user can remove the n scan objects, which were set in the automatic document feeder in the previous image sheet creating process, and set new m (an integer of 1 or more) scan objects in the automatic document feeder. In this state, the user can input scan start instructions to the multifunction machine 10. In this case, the control section 40 determines YES again in S2 and performs the process of S4 to S14 again, thereby creating a new image sheet. Thus, a second image sheet 220 is created. Similarly, a third image sheet 240 is created by a third image sheet creating process.

In the index sheet creating process, the control section 40 first creates a new original index sheet that is a base of the index sheet (e.g. 102) (S18). The new original index sheet created in S18 includes a print layout selection field 120 and an image sheet selection field 130. However, it does not include display information for displaying the thumbnail (e.g. 140), peripheral information (e.g. 140a) of the thumbnail, etc. The respective check boxes (e.g. 132) of the image sheet selection field 130 are provided so that the number of the check boxes corresponds to the number of the image sheets (e.g. 200), which have been created by the control section 40 at the time when the new original index sheet is created in S18. According to the example, the new original index sheet created in S18 by the control section 40 is provided with three check boxes 132 to 136 corresponding to the three image sheets 200 to 240.

Subsequently, the control section 40 creates display information for displaying the respective thumbnails corresponding to the respective scan image data that have been created, in the index sheet 102 (S20). Specifically, the control section 40 creates the display information by determining the identification information of the related scan image data, the display size of the image (thumbnail) displayed by the related scan image data, and the display location of the related thumbnail, for each scan image data, according to a predetermined command. According to the example, in S20, the control section 40 creates the three display information for displaying the three thumbnails 140 to 144 that correspond to the three scan image data indicating three images 202 to 206 of the first image sheet 200, as a group of thumbnails arranged in a first line. The display location included in the three display information indicates the location for arranging the three thumbnails 140 to 144 at the same level as the check box 132. Similarly, the control section 40 creates four display information for displaying the four thumbnails 150 to 156 as a group of thumbnails arranged in a second line, and creates four display information for displaying the four thumbnails 160 to 166 as a group of thumbnails arranged in a third line. The control section 40 adds the created 11 display information to the new original index sheet created in S18.

Subsequently, the control section 40 creates peripheral information of the respective thumbnails (e.g. 140) and arranges the peripheral information in the original sheet (S22). According to the example, in S22, the control section 40 arranges the check boxes 140a to 144a and thumbnail identification information 140b to 144b, which corresponds to the thumbnails 140 to 144, near the thumbnails 140 to 144. Similarly, the control section 40 arranges the check boxes 150a to 156a and 160a to 166a and thumbnail identification information 150b to 156b and 160b to 166b near the thumbnails 150 to 156 and 160 to 166, respectively. Consequently, the index sheet 102 of FIG. 2 is created. After S22 has been completed, the index sheet creating process is terminated and then the process proceeds to S24.

In S24, the control section 40 creates a file 100, which includes the index sheet 102 created in S22, the three image sheets 200, 220, and 240 created in S12, and the 11 scan image data. Subsequently, the control section 40 stores the file created in S24 in the file storage area 30 (see FIG. 1) (S26). After S26 has been completed, the control section 40 terminates the file creating process.

(Printing Process)

Figure 7:
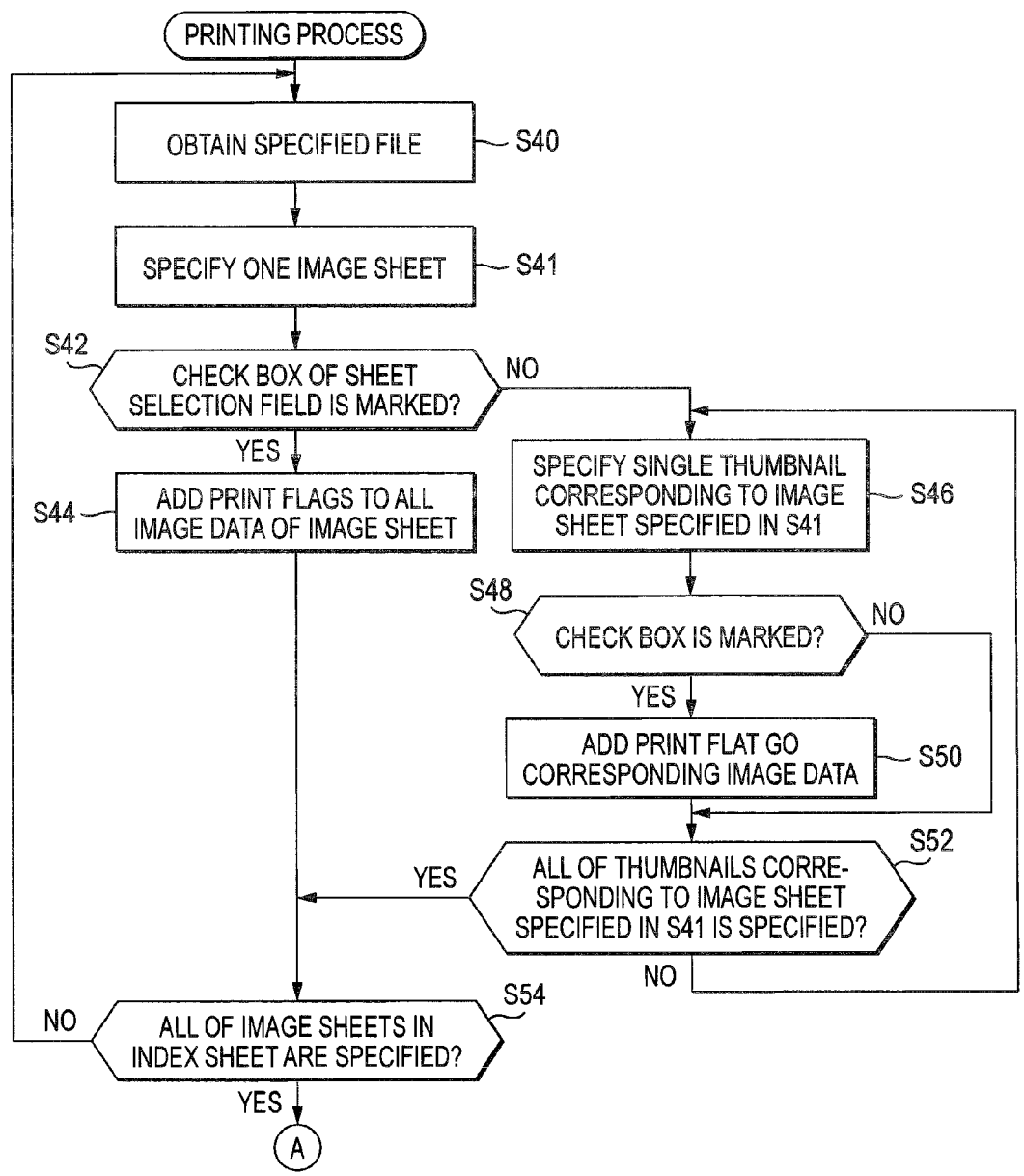
FIG. 7 shows a flow chart of a printing process.
Figure 8:
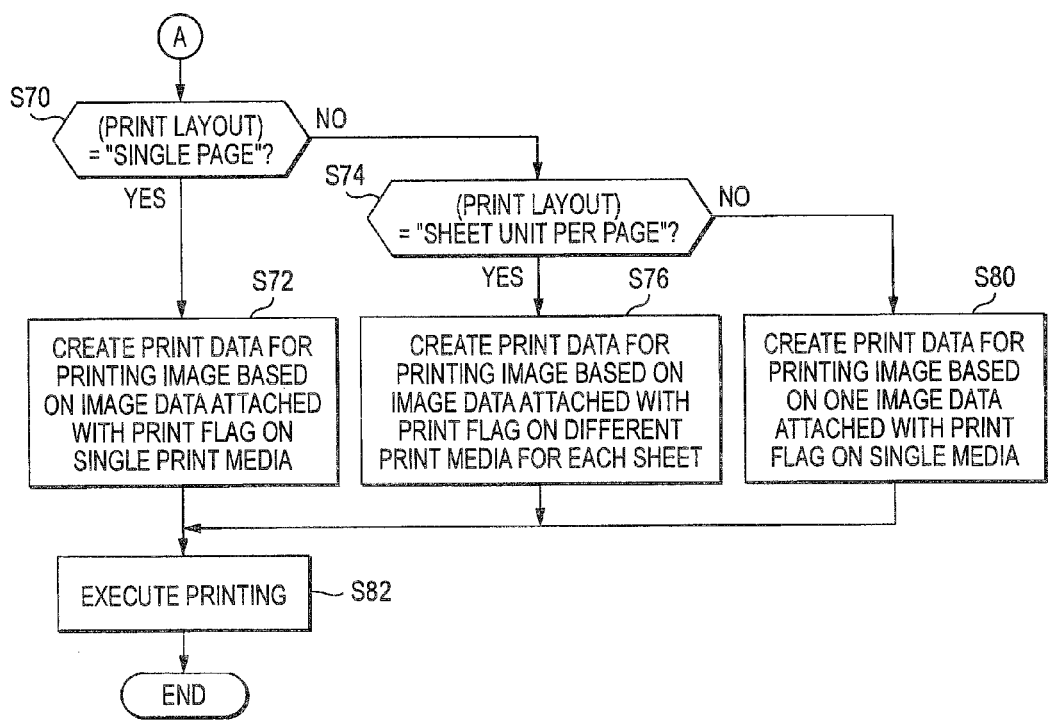
FIG. 8 shows a flow chart of a process continued from FIG. 7.
Figure 9:
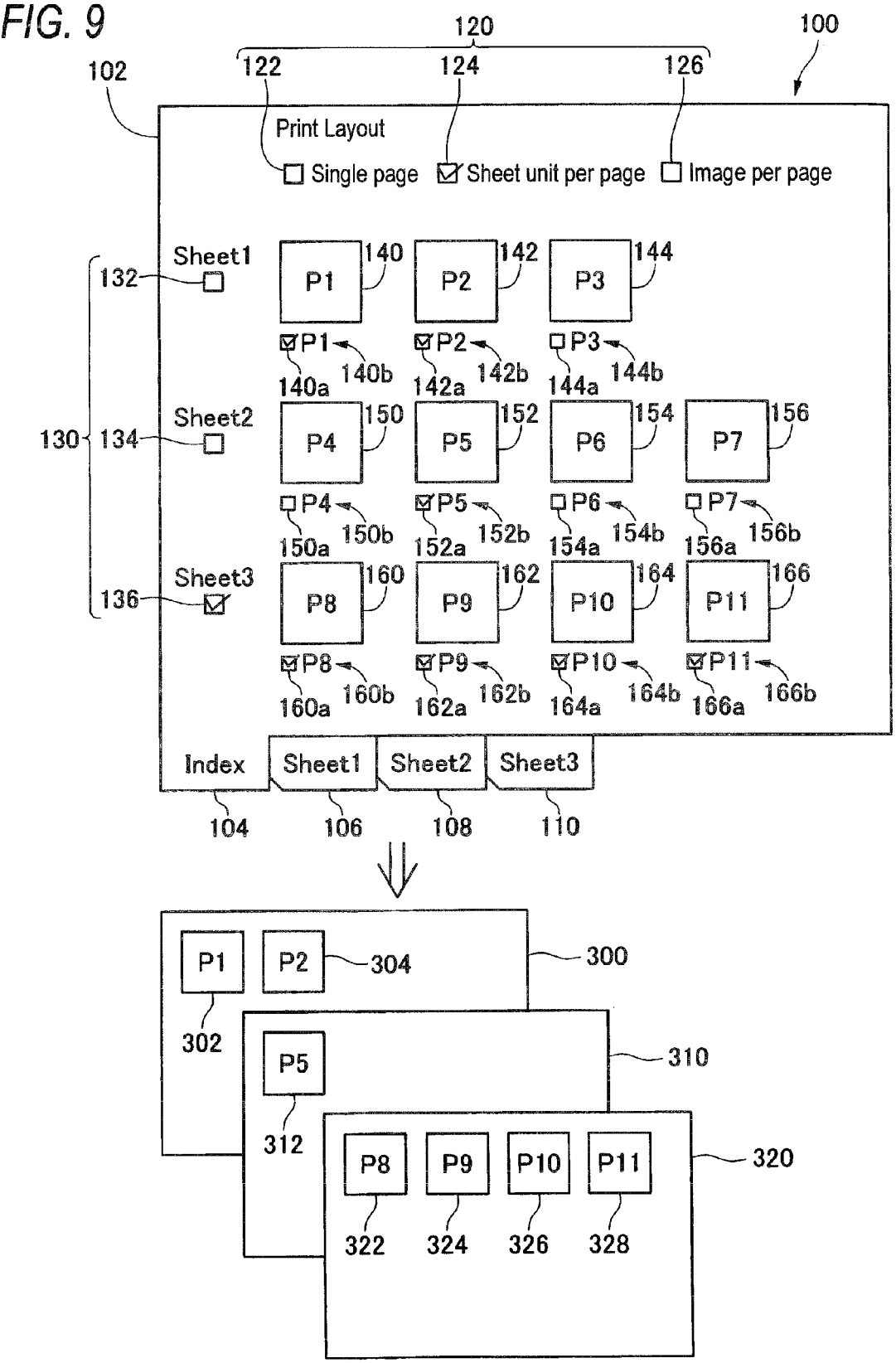
FIG. 9 shows an example of printing performed based on a print layout of a "sheet unit per page"
Figure 10:
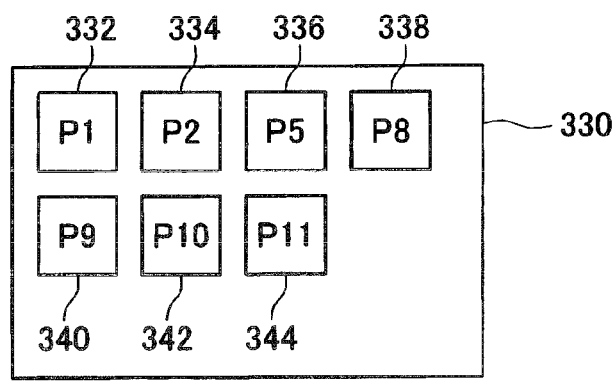
FIG. 10 shows an example of printing performed based on a print layout of a "single page"
Figure 11:
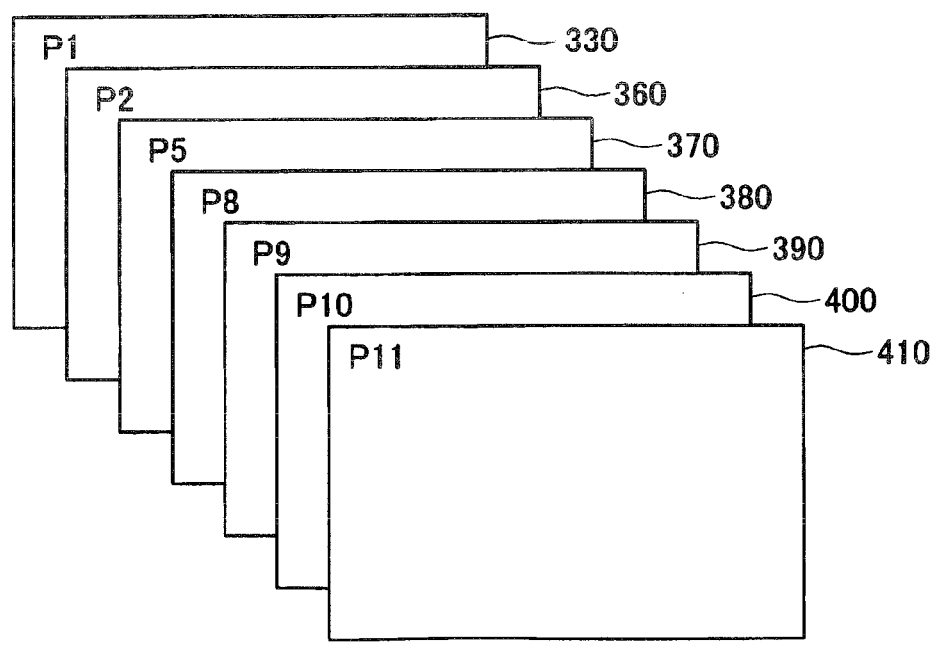
FIG. 11 shows an example of printing performed based on a print layout of an "image per page".

A printing process performed by the control section 40 of the multifunction machine will be described with reference to FIGS. 7 to 11. FIGS. 7 and 8 illustrate flow charts of the printing process that the control section 40 performs. FIGS. 9 to 11 illustrate examples of printing for each print layout. Preconditions required to perform the printing process are as follows. First, the file 100 has been created by the file creating process (see FIG. 6). Second, any one of the check boxes (e.g. 122) of the print layout selection field 120 in the index sheet 102 of the file 100 has been marked by a user. Third, the check box (140a etc.) corresponding to at least one thumbnail, or at least one check box (132 etc.) of the image sheet selection field 130 has been marked by a user. Further, the user can obtain the file 100 from the multifunction machine 10 using the PC 60, for example, and manipulate the PC to display the index sheet 102 in the file 100. The user can mark the check boxes 122, 132, 140a, etc., in the index sheet 102 using the PC 60. In the present embodiment, the content of the printing process will be described referring to the case where the check boxes have been marked as shown in FIG. 9. Further, the file 100 including the index sheet 102 of FIG. 9 will be hereinafter referred to as a "specified file 100".

A user can manipulate the PC 60 to print the specified file 100 including the index sheet 102 shown in FIG. 9. The PC 60 transmits the specified file 100 to the multifunction machine 10. Thus, the control section 40 of the multifunction machine 10 obtains the specified file 100 (S40) and begins the printing process. In addition, the manipulation of printing the file 100 may be performed in different, diverse fashions. For example, a user may instruct the multifunction machine 10 to print the file 100 by storing the specified file 100 in the memory (not shown) of the PC 60 and dragging-and-dropping the file 100 to a printer icon displayed on a display (not shown) of the PC 60. Furthermore, a user may instruct the multifunction machine 10 to print the file 100 by storing the file 100 in an external memory (not shown) and mounting the external memory to the multifunction machine 10.

Subsequently, the print control section 44 (see FIG. 1) specifies one image sheet (e.g. 200) from the specified file 100 obtained in S40 (S41). Subsequently, the print control section 44 determines whether or not the check box (e.g. 132) of the image sheet selection field 130 that corresponds to the image sheet (e.g. 200) specified in S41 has been marked (S42). If S42 determines YES, process proceeds to S44. If S42 determines NO, process proceeds to S46. According to the example, in the case where the print control section 44 specifies the first image sheet 200 or the second image sheet 220 in S41, because the check boxes 132 and 134 are in the unmarked state (see FIG. 9), the print control section 44 determines NO in S42. Conversely, in the case where the print control section 44 specifies the third image sheet 240 in S41, because the check box 136 is in a marked state (see FIG. 9), the print control section 44 determines YES in S42.

In S44, the print control section 44 attaches print flags to all of image data included in the image sheet (e.g. 240) that correspond to the marked check box (e.g. 136). According to the example, in S44, the print control section 44 attaches print flags to four image data (i.e. four scan image data) that are indicative of four images 242 to 248 configured to be displayed in the third image sheet 240 corresponding to the check box 136. Further, in the embodiment of FIG. 9, the index sheet 102 is configured such that if the check box 136 is marked, the check boxes 160a to 166a of the thumbnails 160 to 166 corresponding to the check box 136 (i.e. the third image sheet 240) are also automatically marked. In another embodiment, the index sheet 102 may be configured such that although the check box 136 is marked, the check boxes 160a to 166a corresponding to the thumbnails 160 to 166 are not marked. However, in S44, when the check box 136 becomes marked, the print control section 44 attaches print flags to the four image data indicative of four images 242 to 248 displayed in the third image sheet 240, irrespective of whether or not the check boxes 160a to 166a of the thumbnails 160 to 166 are in a marked state. After S44 has been completed, the process proceeds to S54.

Meanwhile, in S46, the print control section 44 specifies one thumbnail (e.g. 140) corresponding to the image sheet (e.g. 200) specified in S41. Subsequently, the print control section 44 determines whether or not the check box (e.g. 140a) that corresponds to the thumbnail specified in S46 has been marked (S48). If S48 determines YES, the print control section 44 attaches a print flag to image data indicative of the marked thumbnail (e.g. 140) (S50). After S50 has been completed or if S48 determines NO, the process proceeds to S52. According to the example, when the first image sheet 200 is specified in S41, and the print control section 44 specifies the thumbnail 140 in S46, the check box 140a is in a marked state, and the print control section 44 determines YES in S48. In this case, in S50, the print control section 44 attaches a print flag to the image data corresponding to the thumbnail 140. Meanwhile, when the print control section 44 specifies the thumbnail 144 in S46, the check box 144a is in an unmarked state, and the print control section 44 determines NO in S48.

In S52, the print control section 44 determines whether or not all of the thumbnails that correspond to the image sheet (e.g. 200) specified in S41 have been specified. If S52 determines NO, the process returns to S46 and the print control section 44 specifies another thumbnail that corresponds to the image sheet (e.g. 200) specified in S41, and performs the processes after S48 again. Meanwhile, if S52 determines YES, the process proceeds to S54.

In S54, the print control section 44 determines whether or not all of the image sheets 200, 220, and 240 in the index sheet 102 that is included in the specified file 100 have been specified. If S54 determines NO, the process proceeds to S41, and the print control section 44 specifies another image sheet (e.g. 220) in the index sheet 102. Meanwhile, if S54 determines YES, the process proceeds to S70 of FIG. 8. According to the example, the check boxes 132 to 136 and 140a to 166a of the index sheet 102 are marked as shown in FIG. 9. Thus, at the time when S54 determines YES, print flags are attached to the respective image data that correspond to "P1" and "P2" of the first image sheet 200, "P5" of the second image sheet 220, and "P8" to "P11" of the third image sheet 240.

In S70 of FIG. 8, the print control section 44 determines which print layout is selected by a user. Specifically, the print control section 44 specifies which check box 122 to 126 of the print layout selection field 120 in the index sheet 102 has been marked to determine which print layout has been selected.

When the print layout selected by a user is the "single page", the print control section 44 determines that S70 is YES. That is, when the check box 122 in the index sheet 102 is in a marked state, the print control section 44 determines YES in S70. In this case, the print control section 44 (see FIG. 1) creates print data for printing the respective images based on the respective image data to which print flags are attached by the processing of S40 to S54 on one print media, without sorting them by the image sheet (e.g. 200) including corresponding print data (S72). The printing process will now be described based on an example, which differs from the example shown in FIG. 9 in that the check box 122 is in the marked state instead of the check box 124. In this case, 7 image data sets corresponding to "P1", "P2", "P5", "P8", "P9", "P10", and "P11" are attached with print flags. The print control section 44, as shown in FIG. 10, creates print data for printing 7 images 332 to 344 based on the 7 print data sets on a single print media 330. The sizes of the respective images 332 to 344 located to the print data have the same sizes as the display sizes of the respective images (e.g. 202) displayed on the respective image sheets (e.g. 200). However, in a case where all of the images cannot be printed on a single print media if the sizes are maintained, the size of the image to be printed may be decreased. After S72 has been completed, process proceeds to S82, and the print control section 44 controls the print section 18 (see FIG. 1) to execute printing according to print data created in S72. After S82 has completed, the print control section 44 terminates the printing process. In this case, as a result of the printing process, a single print media 330 is obtained as shown in FIG. 10.

If the print layout selected by a user corresponds to the "sheet unit per page", the print control section 44 determines NO in S70 and YES in S74. That is, if the check box 124 in the index sheet 102 is marked (see FIG. 9), the print control section 44 determines YES in S74. In this case, the print control section 44 creates print data for printing the respective images based on the respective image data (e.g. 202) to which print flags are attached by the process of S40 to S54 on different print medium for each image sheet (e.g. 200) including corresponding image data (S76). The printing process will now be described based on FIG. 9 as an example. In this case, 7 image data sets corresponding to "P1", "P2", "P5", "P8", "P9", "P10", and "P11" are attached with print flags. The print control section 44, as shown in FIG. 9, creates print data for printing images 302 and 304 based on the 2 image data sets attached with the print flags among 3 image data sets included in the first image sheet 200 on a single print media 300. The print control section 44 creates the print data such that the images 302 and 304 are printed according to two attribute information (size, location and the like) corresponding to two image data sets included in the first image sheet 200. That is, the print control section 44 creates the print data such that the size of the images 302 and 304 coincides with the display size of the images 202 and 204. Furthermore, the print data is created such that the location of the images 302 and 304 on the print media coincides with that of the images 202 and 204 in the first image sheet 200 (i.e. a location relationship in which the image 202 is arranged on the left side and the image 204 on the right side).

Similarly, the print control section 44 creates print data for printing an image 312 based on a single image data set attached with a print flag among 4 image data sets included in the second image sheet 220 on another print media 310 different from the print media 300. The print control section 44 creates the print data such that the image 312 is printed according to attribute information (size, location and the like) of the image data corresponding to an image 224 included in the second image sheet 220. That is, the print control section 44 creates the print data such that the size of the image 312 coincides with the display size of the image 224. Furthermore, the print data is created such that the image 312 on the print media 310 is arranged on the utmost left side. In another embodiment, the print data may be created such that the location of the image 312 on the print media 310 coincides with that of the image 224 in the image sheet 220. Furthermore, the print control section 44 creates print data for printing the images 322 to 328 based on 4 image data sets attached with print flags among 4 image data sets included in the third image sheet 240 on a single print media 320 different from the print media 300 or 310. The print control section 44 creates the print data such that the images 322 to 328 are printed according to 4 attribute information sets (size, location and the like) corresponding to 4 image data sets included in the third image sheet 240. That is, the print control section 44 creates the print data such that the size of the images 322 to 328 coincides with the display size of the images 242 to 248. Furthermore, the print data is created such that the location of the images 322 to 328 on the print media 320 coincides with that of the images 242 to 248 to be displayed in the third image sheet 240 (i.e. a location relationship in which the images 242 to 248 are arranged in series from the left side).

After S76 has been completed, the process proceeds to S82, and the print control section 44 controls the print section 18 to execute printing according to print data created in S76. After S82 has completed, the print control section 44 terminates the printing process. In this case, as a result of the printing process, three print media 300, 310, and 320 are obtained as shown in FIG. 9.

In the case where the print layout selected by a user is the "image per page", the print control section 44 determines NO in S74. That is, when the check box 126 in the index sheet 102 is in the marked state, the print control section 44 determines NO in S74. In this case, the print control section 44 creates print data for printing an image based on one of the respective image data to which print flags are attached by the processing of S40 to S54 shown in FIG. 7 on a single print media (S80). The printing process will now be described based on an example, which differs from the example shown in FIG. 9 in that the check box 126 is in the marked state instead of the check box 124. In this case, 7 image data sets corresponding to "P1", "P2", "P5", "P8", "P9", "P10", and "P11" are attached with print flags. The print control section 44, as shown in FIG. 11, creates print data for printing 7 images based on the 7 image data on 7 print media 350 to 410, respectively (S80). In the embodiment, the size of the respective images configured to be printed on the respective print media 350 to 410 do not coincide with the size of the images (e.g. 202) displayed in the respective image sheets (e.g. 200), but instead coincides with the size of the original scan image data. After S80 has been completed, the process proceeds to S82, and the print control section 44 controls the print section 18 to execute printing according to print data created in S80. After S82 has been completed, the print control section 44 terminates the printing process. In this case, as a result of the printing process, 7 print media 350 to 410 are obtained as shown in FIG. 11.

In the present embodiment, a user can scan a plurality of scan objects into a plurality of groups. First, the user scans n sheets of scan objects so as to obtain n sets of image data. The control section 40 creates n sets of attribute information for displaying n images (e.g. 202) in an image sheet (e.g. 200) (see FIG. 6). Subsequently, the user scans m sheets of scan objects so as to obtain m sets of image data. The control section 40 creates m sets of attribute information for displaying m images (e.g. 222) in an image sheet (e.g. 220). The n images and the m images are divided in groups by the image sheets in which the images are displayed. The user can select the image data for printing. In a case where the print layout selected by a user corresponds to the "sheet unit per page", the print control section 44, as shown in S76 and S82 in FIG. 8, and FIG. 9, creates print data for arranging the images (e.g. 302) corresponding to the respective image data selected by a user in such a manner as to be printed on different print media (e.g. 300) for each image sheet (e.g. 200) including corresponding image data, and controls the print section 18 to execute printing according to the print data. That is, the print control section 44 allows the images (e.g. 302) to be printed on different print medium (e.g. 300) for each group according to the user's intention.

In the present embodiment, the print control section 44 is configured to perform a printing process based on three different print layouts [i.e. including units of "single page" (FIG. 10), "sheet unit per page" (FIG. 9), and "image per page" (FIG. 11)], depending on the check box which is marked among the respective check boxes 122 to 126 included in the print layout selection field 120. The printing process can be conducted such that a printing result is obtained based on the print layout selected by a user.

Figure 2:
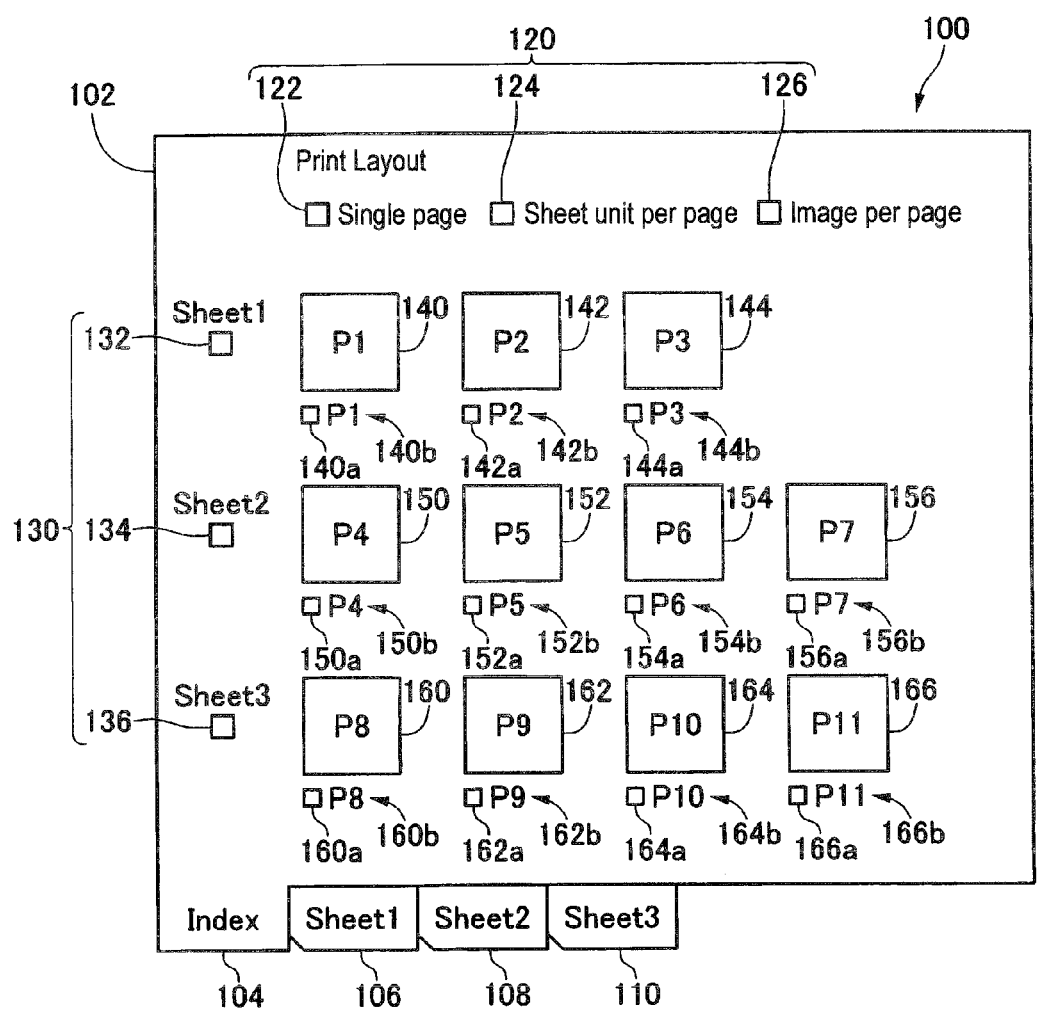
FIG. 2 shows an example of index sheet.

In the present embodiment, as shown in FIG. 2, the index sheet 102 includes thumbnails (e.g. 140) that are reduced-size sets of image data of the image data corresponding to the respective images (e.g. 202) configured to be displayed in the respective image sheets (e.g. 200). Upon referring to the index sheet 102, a user can easily perceive an image to be printed only by identifying the thumbnail (e.g. 140) without referring to the image sheets (e.g. 200).

In the present embodiment, in a case where the respective check boxes (e.g. 136) of the image sheet selection field 130 of the index sheet 102 are in the marked state, as shown in S44 of FIG. 7, the print control section 44 offers print flags to the image data corresponding to the respective thumbnails 160 to 166, irrespective of whether or not the check boxes 160a to 166a of the thumbnails 160 to 166 have been marked. In a case that a user wants to print all four image data corresponding to four images 242 to 248 of the image sheet 240, upon selecting the respective four image data, there is no need to individually perform an operation for marking all of the check boxes 160a to 166a of the corresponding thumbnails 160 to 166. This can reduce the user's load.

Correlation between elements of the embodiment and elements of the invention will be described. The multifunction machine 10 is an example of a "control apparatus". The image sheets 200 to 240 are an example of "one or more first type sub-files". The index sheet 102 is an example of a "second type sub-file". The file 100, a check box of which is marked, is an example of a "specified file". The 11 scan image data sets of the embodiment (i.e. 11 sets of image data included in the file 100) are an example of "image data". The thumbnails (e.g. 140), the check boxes (e.g. 140a), the image names (e.g. 140b), and the like are an example of "image information".

Particularly, the check boxes (e.g. 140a) are an example of "image selection information", and the thumbnails (e.g. 140) are an example of "contracted image data of image data". The image data indicating the thumbnails that correspond to the marked check boxes (e.g. 140a) for each thumbnail are an example of "selected image data". The respective check boxes 122 to 126 in the print layout selection field 120 in the index sheet 102 are an example of "layout selection information". Further, the respective check boxes 132 to 136 in the image sheet selection field 130 in the index sheet 102 are an example of "sub-file selection information". A printing result to be displayed on the print medium 300 to 320 of FIG. 9 is an example of a "first printing result", a printing result to be displayed on the print media 330 of FIG. 10 is an example of a "second printing result", and a printing result to be displayed on the print medium 350 to 410 of FIG. 11 is an example of a "third printing result".

Potential modifications to the embodiment are described hereafter.

(1) In the aforementioned embodiment, the PC 60 transmits the specified file 100 to the multifunction machine 10, so that the control section 40 of the multifunction machine 10 obtains the specified file 100 (S40 of FIG. 7) and begins a printing process. However, when a user manipulates the operation section 12 of the multifunction machine 10 so as to input the start operation of a certain printing process, the multifunction machine 10 may be configured to obtain the specified file 100 from the file storage area 30 and allow the print control section 44 to perform a printing process, according to the file identification information included in the start operation of the certain printing process.

(2) While in the aforementioned embodiment, the control section 40 of the multifunction machine 10 includes the file obtaining section 42 and the print control section 44, the PC 60 may include the file obtaining section 42 and the print control section 44 instead. In this case, a process is conducted as follows. First, a user may manipulate the operation section of the PC 60 so as to mark any one of the check boxes (e.g. 122) of the print layout selection field 120 in the index sheet 102 of the created file. Additionally, the user can mark the check box (e.g. 140a) corresponding to at least one thumbnail or at least one of the check boxes (e.g. 132) of the image sheet selection field 130. In this way, the file obtaining section 42 of the PC 60 obtains the specified file 100. The print control section 44 of the PC 60 creates print data for allowing the print section 18 of the multifunction machine 10 to execute printing according to the specified file 100. The print control section 44 of the PC 60 supplies the created print data to the multifunction machine 10.

(3) In the aforementioned embodiment, in a case that the print layout is the "image per page", as in S78 and S80 in FIG. 8, the print data is created using original scan image data. However, in case that the print layout is an "image per page", the print data may be created such that the printing process is conducted in a display size of the image (e.g. 202) displayed in the image sheet, other than the original scan image data.

(4) In the aforementioned embodiment, the display size of the image (e.g. 202) in the image sheet (e.g. 200) is the size of the image to be displayed by the scan image data which is reduced to a certain size. However, the display size may be of the same size as that of the image to be displayed by the scan image data, or otherwise be enlarged to a certain size.

(5) In the aforementioned embodiment, the image sheet (e.g. 200) includes attribute information for displaying an image (e.g. 202) based on an image data. This means that the image sheet (e.g. 200) may indirectly include the image data. However, the image data may be attached to the image sheet (e.g. 200). That is, the image sheet (e.g. 200) may directly include the image data. Generally speaking, the first type sub-file may either directly or indirectly include the image data. Similarly, the second type sub-file may either directly or indirectly include the reduced-sized sets of image data (such as thumbnails) of the image data.

While the invention has described heretofore exemplary embodiments, they are provided only by way of illustration, and therefore do not limit the scope of claims. Embodiments of the claims include various changes and modifications. Technical elements described in the disclosure and drawings become technically available in a sole or combined form, and thus are not limited to a combination described in claims when the application was filed. Further, while the technology described in this disclosure and drawings simultaneously accomplishes one or more objects, accomplishing one of objects has a technical availability in itself.

What is claimed is:

1. A printing control apparatus comprising:
   a file obtaining section that obtains a specified file, which includes one or more sub-files of a first type and a sub-file of a second type; and
   a print control section that controls a print section to execute printing according to the specified file,
   wherein the one or more sub-files of the first type includes one or more sets of image data,
   wherein the sub-file of the second type includes sets of image information that corresponds to the sets of image data included in the one or more sub-files of the first type,
   wherein the corresponding sets of image information include image selection information that indicates whether each set of image data corresponding to the image information is selected,
   wherein the print control section controls the print section to print an image based on the selected image data corresponding to the image selection information,
   wherein during a specified mode, when a first sub-file of the first type includes M (M being an integer equal to or greater than 1) sets of selected image data and a second sub-file of the first type includes N (N being an integer equal to or greater than 1) sets of selected image data, the print control section controls the print section to obtain a first printing result in which M images based on the M sets of selected image data are printed on a first print medium, and N images based on the N sets of selected image data are printed on a second print medium, which is different from the first print medium,
   wherein the sub-file of the second type further includes layout selection information which indicates a selected layout,
   wherein in the specified mode, when the layout selection information indicates a first layout, the print control section controls the print section to obtain the first printing result.

2. The printing control apparatus according to claim 1,
   wherein during the specified mode the print control section controls the print section to obtain the first printing result such that the M images are printed on the first print medium according to attribute information of the M sets of selected image data in a first sub-file of the first type and the N images are printed on the second print medium according to attribute information of the N sets of selected image data in a second sub-file of the first type.

3. The printing control apparatus according to claim 1,
   wherein in the specified mode, when the layout selection information indicates an alternative layout, which is different from the first layout, the print control section controls the print section to obtain an alternative printing result, which is different from the first printing result.

4. The printing control apparatus according to claim 3,
   wherein when the layout selection information indicates that the alternative layout is a second layout, the print control section controls the print section to obtain a second printing result in which the M images and the N images are printed on a single print medium.

5. The printing control apparatus according to claim 3,
   wherein when the layout selection information indicates that the alternative layout is a third layout, the print control section controls the print section to obtain a third printing result in which two or more images including the M images and the N images are respectively printed on different print media.

6. The printing control apparatus for printing according to claim 1,
   wherein the image information includes reduced-size image data of the respective image data corresponding to the respective image information.

7. The printing control apparatus for printing according to claim 1,
   wherein the sub-file of the second type further includes sub-file selection information corresponding to the one or more sub-files of the first type, the sub-file selection information indicating whether the corresponding sub-file of the first type is selected,
   wherein when the sub-file selection information corresponding to a specified sub-file of the first type indicates that the specified sub-file of the first type is selected, the print control section determines that the image data corresponding the specified sub-file of the first type is selected image data without regard to the image selection information corresponding to the image data included in the specified sub-file of the first type, and
   wherein when the sub-file selection information corresponding to the specified sub-file of the first type indicates that the specified sub-file of the first type is not selected, the print control section determines whether or not the image data is the selected image data based on the image selection information corresponding to the image data included in the specified sub-file of the first type.

8. A non-transitory computer readable medium storing a computer program for causing a printing control apparatus to perform a method of:
   obtaining a specified file including one or more sub-files of a first type and a sub-file of a second type; and
   performing a printing process in which a print section is controlled to execute printing according to the specified file,
   wherein the one or more sub-files of the first type includes one or more sets of image data,
   wherein the sub-file of the second type includes sets of image information that correspond to the sets of image data included in the one or more sub-files of the first type,
   wherein the corresponding sets of image information include image selection information that indicates whether the respective sets of image data corresponding to the respective image information are selected,
   wherein during the printing process an image based on the selected image data corresponding to the image selection information is printed, and
   wherein in a specified mode, a first sub-file of the first type includes M (M being an integer equal to or greater than 1) sets of selected image data and a second sub-file of the first type includes N (N being an integer equal to or greater than 1) sets of selected image data, the printing process is performed to obtain a first printing result in which M images based on the M sets of selected image data are printed on a first print medium, and N images based on the N sets of selected image data are printed on a second print medium which is different from the first print medium, wherein the sub-file of the second type further includes layout selection information which indicates a selected layout, wherein in the specified mode, when the layout selection information indicates a first layout, the print section is controlled to obtain the first printing result.

* * * * *